(12) United States Patent
Hind

(10) Patent No.: US 6,826,201 B2
(45) Date of Patent: Nov. 30, 2004

(54) MULTIPLEXING SONET /SDH DATA STREAMS USING INDEPENDENT ENCODING SCHEMES

(75) Inventor: Joleen K. Hind, Ottawa (CA)

(73) Assignee: Nortel Networks Limited, St. Laurent (CA)

(*) Notice: Subject to any disclaimer, the term of this patent is extended or adjusted under 35 U.S.C. 154(b) by 896 days.

(21) Appl. No.: 09/739,393

(22) Filed: Dec. 19, 2000

(65) Prior Publication Data

US 2002/0075903 A1 Jun. 20, 2002

(51) Int. Cl.[7] .............................. H04J 3/04; H04J 14/00
(52) U.S. Cl. ....................... 370/535; 370/536; 370/537; 370/542; 398/75
(58) Field of Search ................................ 370/476, 477, 370/479, 535, 536, 537, 540, 542; 398/68–72, 74, 75

(56) References Cited

U.S. PATENT DOCUMENTS

| | | | | |
|---|---|---|---|---|
| 4,835,768 A | | 5/1989 | Hubbard et al. ............ 370/106 |
| 5,251,210 A | * | 10/1993 | Mann et al. ................ 370/519 |
| 5,583,855 A | | 12/1996 | Ball ........................... 370/376 |
| 5,675,580 A | * | 10/1997 | Lyon et al. ............ 370/395.51 |
| 5,841,760 A | * | 11/1998 | Martin et al. ............... 370/242 |
| 5,923,653 A | | 7/1999 | Denton ....................... 370/375 |
| 6,041,043 A | | 3/2000 | Denton et al. .............. 370/254 |
| 6,118,795 A | | 9/2000 | Fukunaga et al. .......... 370/503 |
| 6,356,550 B1 | * | 3/2002 | Williams .................... 370/364 |
| 6,377,645 B1 | * | 4/2002 | Chen et al. ................. 375/372 |
| 6,430,201 B1 | * | 8/2002 | Azizoglu et al. ........... 370/535 |
| 6,519,244 B1 | * | 2/2003 | Unno ......................... 370/342 |
| 6,526,021 B1 | * | 2/2003 | Dempsey .................... 370/227 |
| 6,636,529 B1 | * | 10/2003 | Goodman et al. .......... 370/469 |
| 2003/0026298 A1 | * | 2/2003 | Bisson et al. ............... 370/537 |

OTHER PUBLICATIONS

Alberto Leon–Garcia, Communication Networks, Copyright 2000 by The McGraw–Hill Companies, Inc., pp. 199–208.*

* cited by examiner

Primary Examiner—Hassan Kizou
Assistant Examiner—Gregory Sefcheck
(74) Attorney, Agent, or Firm—Max R. Wood; Ogilvy Renault

(57) ABSTRACT

A system for transparently transporting m synchronous data streams as an aggregate data stream on a single channel of a Wave Division Multiplexed (WDM) optical link without pointer processing uses m unique encoding schemes to enable recovery of the respective m data streams from the aggregate data stream. The encoding schemes are preferably self-inverting. The respective m data streams are parsed into data units and encoded. The data units are then interleaved to form the aggregate data stream. Recovery is accomplished using a reverse process.

33 Claims, 4 Drawing Sheets

MULTIPLEXING SONET /SDH DATA STREAMS USING INDEPENDENT ENCODING SCHEMES

CROSS-REFERENCE TO RELATED APPLICATIONS

This is the first application filed for the present invention.

MICROFICHE APPENDIX

Not applicable.

TECHNICAL FIELD

The present invention relates to the multiplexing of SONET/SDH data streams and, in particular, to a method of interleaving tributary data streams and recovering the tributary data streams, using unique, independent encoding schemes.

BACKGROUND OF THE INVENTION

Optical fiber, because of its data transfer capacity and reliability, has become a commonly used medium for data transport. Synchronous Optical NETwork (SONET) and Synchronous Digital Hierarchy (SDH) standards are used to enable network devices, made by different manufacturers, to receive and transmit data streams through optical networks. Certain optical fibers have the capacity to convey independent data streams on multiple wavelength channels. The transmission of data streams onto different wavelength channels of a single fiber is familiar to those skilled in the art, and referred to as Wave Division Multiplexing (WDM).

The data stream with a lowest density defined by current SONET standards is a stream of frames transmitted every 125 microseconds. Each frame includes three 9-byte columns of transport overhead and 87 9-byte columns of payload. This least dense SONET stream is called a Synchronous Transport Signal (STS-)1. A stream of STS-n frames convey n byte interleaved columns of STS-1 frames respectively, at the same rate of 8000 frames/s. For example, the first nine 9-byte columns of an STS-3 frame are transport overhead, and the remaining 261 columns are referred to as the Synchronous Payload Container. The transport overhead consists of section overhead, as defined by the SONET standard.

The first bytes of the an STS-1 frame are A1 and A2 bytes. These bytes are used to detect the beginning of frames, which permits SONET devices to parse SONET frames into constituent bytes.

The SONET standard defines the structure of a the frames, and the key to extracting data from the frames. A set of virtual tributaries (VTs) that make up the payload of a frame are indexed by pointer fields in the section overhead. The SONET standard also provides a protocol for producing higher bit-rate streams from STS-1 frames m Synchronous Transport Signal (STS)-n frames can be byte interleaved to produce an STS-(n×m) data stream, or can be concatenated to produce an STS-(n×m)c data stream. The transport, section, line and path overheads of higher bit-rate streams are also defined by the SONET standard. The section and line overhead of higher bit rate SONET frames are not identical to those of the constituent frames, and so when an STS-(n×m) data stream is formed, the overhead of the component data streams must be replaced. The byte interleaving and replacing of section and line overhead is referred to as "reframing".

SONET signals are received by a class of SONET network elements (which includes line and section terminating equipment and routers), and the beginning of a SONET frame is detected by A1 and A2 byte filters.

The SDH protocol is very similar to the SONET protocol, but the two are not compatible to an extent that network elements adapted to propagate or terminate frames can be interchangeably used for either protocol. Consequently, if SONET frames are to be converted to SDH frames, or vice versa, a complex reformatting process is required. An example of a reformatting process is described in Assignee's co-pending U.S. patent application Ser. No. 09/494,518 which was filed on Jan. 31, 2000 and entitled METHOD AND APPARATUS FOR CROSS-CONNECTING DATA STREAMS WITH EFFICIENT MEMORY UTILIZATION AND TRANSPARENT PROTOCOL CONVERSION.

As is well known in the art, the speed of data transmission over optical fiber has been increasing at a steady and rapid rate. Consequently, as new high-speed equipment is connected into optical networks, it is often desirable to multiplex lower speed data streams for transport across the network in order to take advantage of the transport capacity of high-speed links. This gives rise to certain problems, however. First, in order to multiplex data streams in either SONET or SHD format, the frames must be pointer processed and reformatted as described above. The pointer processing changes certain frame header information, however, and this is not always acceptable to transport service customers. Second, SONET and SHD frames cannot be multiplexed together because of well understood incompatibilities between the two protocols.

It is therefore desirable to provide a method and apparatus that permits a plurality of low-speed data streams to be multiplexed onto a high-speed data channel without pointer processing, so that the multiplexing demultiplexing process is completely transparent to transport service customers. It is also desirable to provide a method and apparatus that permits synchronous data streams that conform to different protocols to be transparently multiplexed together without protocol conversion or pointer processing.

SUMMARY OF THE INVENTION

It is therefore an object of the invention to provide a method and apparatus for multiplexing/demultiplexing synchronous data streams in either SONET or SDH protocol, or any combination of the two protocols.

It is a further object of the invention to provide a method and apparatus for transparently multiplexing/demultiplexing synchronous data streams without pointer processing or protocol conversion.

Accordingly, the invention provides a method and system for encoding and multiplexing source data streams to form an aggregate data stream that is demultiplexed into component data streams using a self-inverting encoding scheme.

This is accomplished using a set of self-inverting encoding schemes, one for each of the data streams. The self-inverting encoding schemes are applied to the respective data streams. Each of the self-inverting encoding schemes must adhere to certain criteria. First, the encoding schemes of any given set must be unique. Second, the framing bytes of one data stream encoded by the encoding scheme associated with that stream must not, when decoded by any one of the other data streams, be identical to a framing byte of the one of the other data streams. The restriction of independence of a set of encoding schemes is ensured if the operation of any one of the set of encoding schemes does not influence the operation of the others in the set.

The method begins with parsing each of the m synchronous data streams into data units. This is accomplished by detecting respective framing bytes of each data stream. The data units of respective synchronous data streams are encoded using a respective encoding scheme, and then the encoded data units are interleaved to produce a serialized aggregate data stream.

The recovery of any one of the m synchronous data streams is performed by copying the aggregate data stream and applying a decoding scheme to data units of the copy of the aggregate data stream. The decoded data stream is then passed to a framer, which detects one or more framing bytes. After the framing bytes are detected, the remaining data units are recovered using a simple counting process in which every $m^{th}$ data unit is selected to recover the one of the m synchronous data streams.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The invention involves applying a respective encoding scheme to data units of each of m data streams, interleaving the encoded data units of the m data streams to form an aggregate data stream. Decoding schemes that invert the encoding schemes are then applied to respective copies of the aggregate data stream. De-interleaving is accomplished by selecting only data units that belong to the respective decoded data streams by selecting every $m^{th}$ byte from each data stream after frame header bytes are located.

Figure 1:
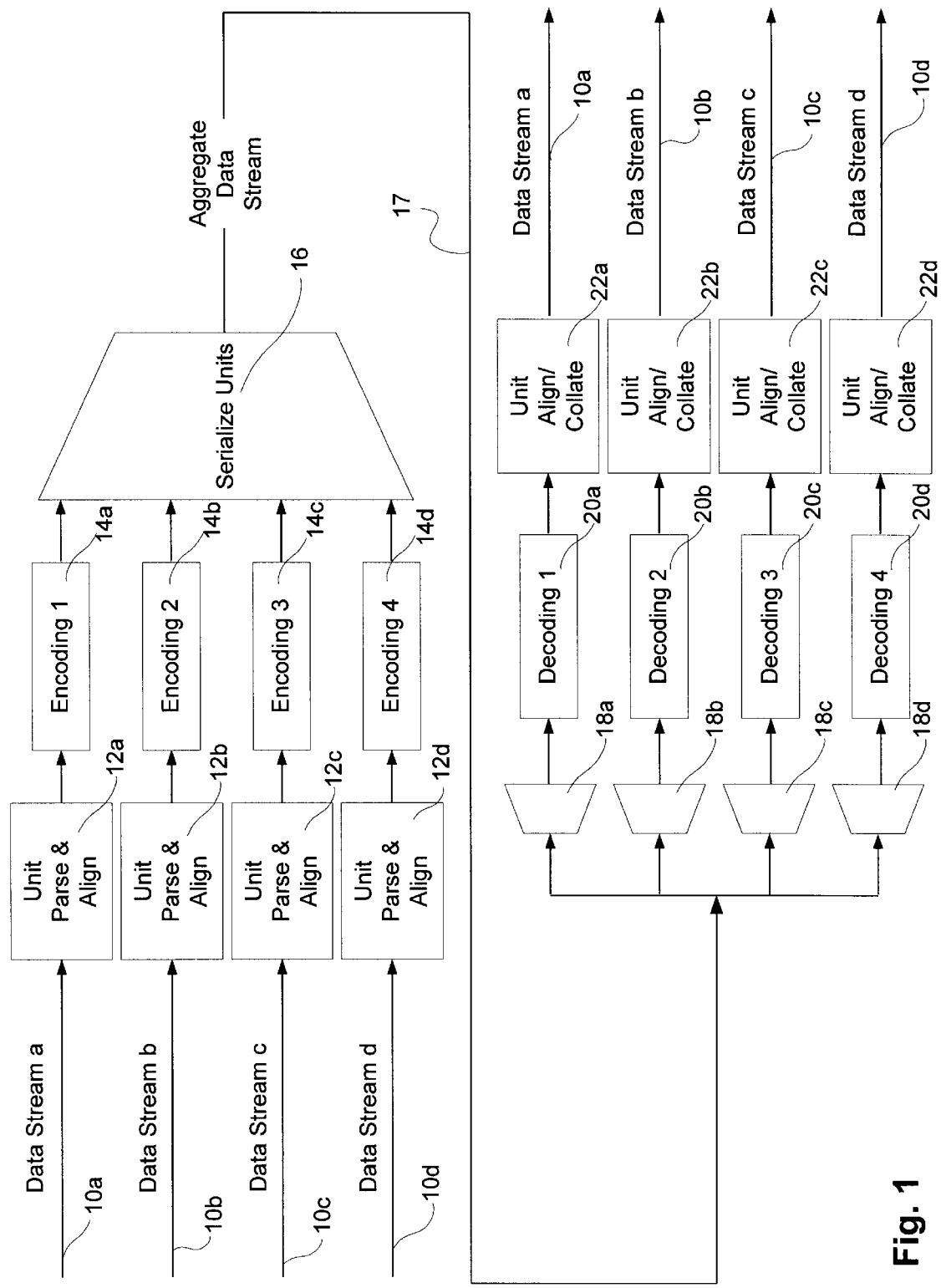
FIG. 1 is a schematic diagram of functional components of an embodiment of the present invention.

FIG. 1 is a schematic diagram of an embodiment of the present invention. Four synchronous data streams 10a–10d are received by respective data unit parsers 12a–12d. The data unit parsers 12a–12d include an elastic store for byte-aligning the synchronous data streams 10a–10d. The data unit parsers 12a–12d also include framing byte detectors for detecting A1/A2 framing bytes of SONET/SDH frames. Once the A1/A2 bytes are located, the respective data streams 10a–10d are parsed into fixed-length data units (1 byte, for example). After the respective data streams 10a–10d have been parsed into data units, their component data units are encoded one at a time by encoders 14a–14d using unique encoding schemes, as will be explained below in more detail. The output of the encoders 14a–14d is passed to a multiplexer 16 that interleaves the respective data units to form an aggregate data stream 17.

Recovering the synchronous data streams involves reproducing the aggregate data stream in deserializers 18a–18d to produce four copies. The deserializers 18a–18d divide the aggregate data stream 17 into data words that are divided into data units and passed to a respective decoder 20a–20d. Each decoder 20a–20d decodes the data units of the data stream using a decoding scheme adapted to revert a corresponding one of the encoding schemes. The four decoded aggregate data streams are passed to data unit collators 22a–22d, which byte align and then collate the respective data streams. The collators 22a–22d select data units from the respective aggregate data streams, starting with the A1 byte. The selection is governed by the number m of synchronous data streams 10a–10d in the aggregate data stream 17. After the A1 byte is detected and selected, every $m^{th}$ data unit is selected from the aggregate data stream and collated to from a respective one of the recovered synchronous data streams 10a–10d.

As will be understood by those skilled in the art, certain restrictions apply to the synchronous data streams 10a–10d. For example, the four synchronous data streams 10a–10d must all have the same bit rate. The data streams must also be synchronized at the same frequency, and a beginning of each frame is indicated by A1/A2 framing bytes, which is the case for SONET/SDH data streams. There is no requirement, however, that the synchronous data streams be in the same format. Any combination of SONET and SDH data streams can be multiplexed together.

Figure 2:
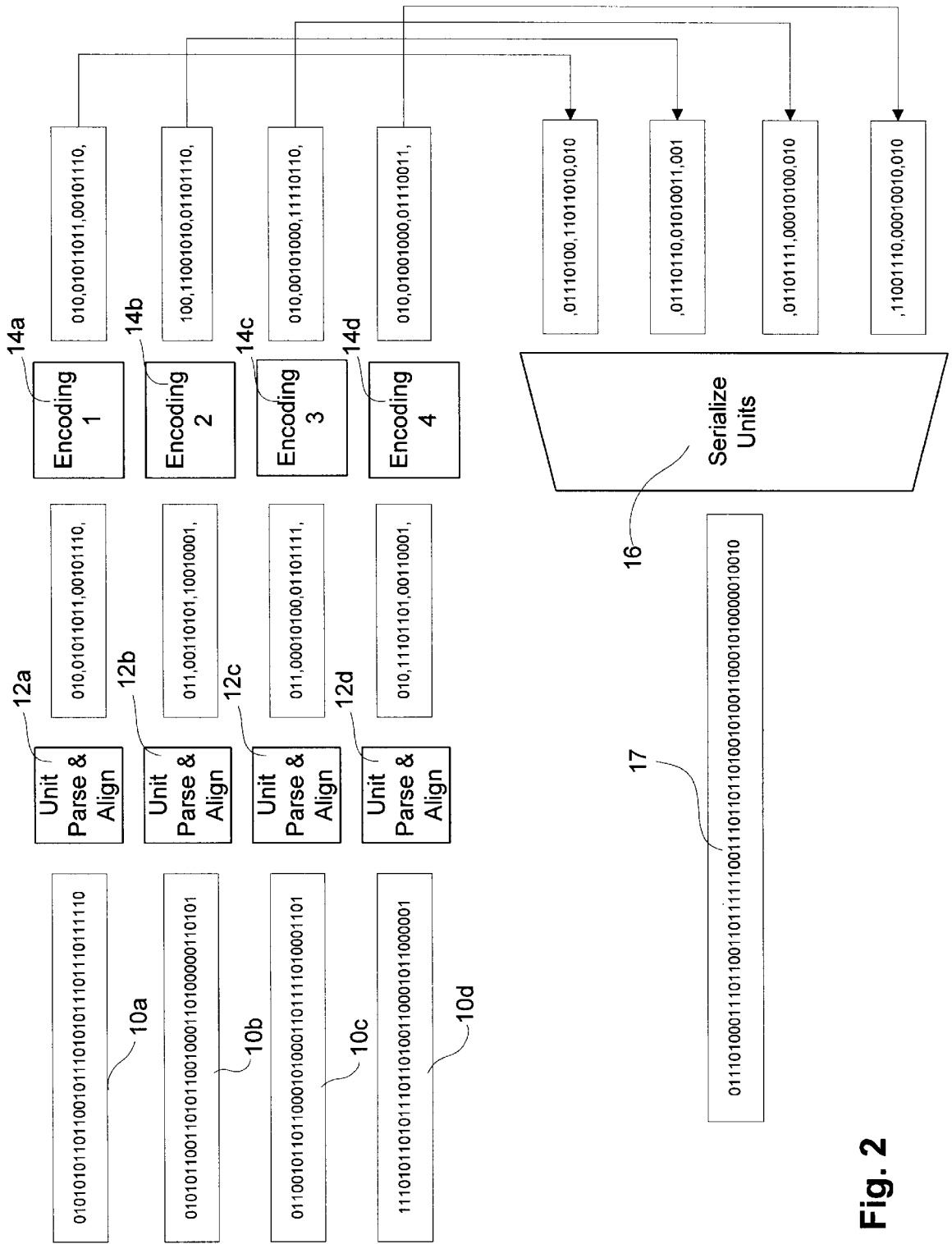
FIG. 2 is a schematic diagram of an example of the functioning of the encoding and interleaving aspect of an embodiment of the invention.

FIG. 2 schematically illustrates four examples of bit streams parsed by respective data unit parsers 12a–12d. In the example shown, the unit parsers 12a–12d have first byte aligned the respective data streams 10a–10d, and parsed the respective data streams into respective data units that are passed to the respective encoders 14a–14d.

The successive data units are received by the encoders, which apply a respective one of the encoding schemes 14a, 14b, 14c and 14d. Each encoding scheme performs a reversible encoding operation on each data unit independently. The four encoding schemes are subject to only one constraint. If the A1 byte (hexidecimal: F 6, binary 1111 0110) or the A2 byte (hexadecimal: 2 8, binary 0010 1000) is encoded by one of the encoding schemes, and subsequently decoded by any of the decoding schemes used to reverse any of the other encoding schemes, the result must not produce an A1 or an A2 byte. For the purposes of the present invention, the term "encoding scheme" is intended to encompass an identity mapping of data units.

The example illustrated in FIG. 2 shows how the four exemplary encoding schemes of the present embodiment modify example data units. The four exemplary encoding schemes (further illustrated in FIG. 4) are defined by the following four functions:

Encoding 1 (FIG. 4, 24): (abcdefgh)=(abcdefgh),

Encoding 2 (FIG. 4, 26): (abcdefgh)= (~a~b~c~d~e~g~f~h)

Encoding 3 (FIG. 4, 28): (abcdefgh)=(hgfedcba), and

Encoding 4 (FIG. 4, 30): (abcdefgh)= (~h~g~f~e~d~c~b~a), where "~" represents a boolean negation of a value of a bit.

The four encoding schemes are self-inverting, that is, applying any of the encoding schemes 1–4 to a data unit twice returns the original data unit. These four encoding schemes were selected because of the simplicity of implementation using simple logical circuits schematically illustrated in FIG. 4.

The encoded bytes of each of the four data streams 10a–10d are then byte interleaved by the multiplexer 16 in a manner known in the art, to form the aggregate data stream 17.

Figure 3:
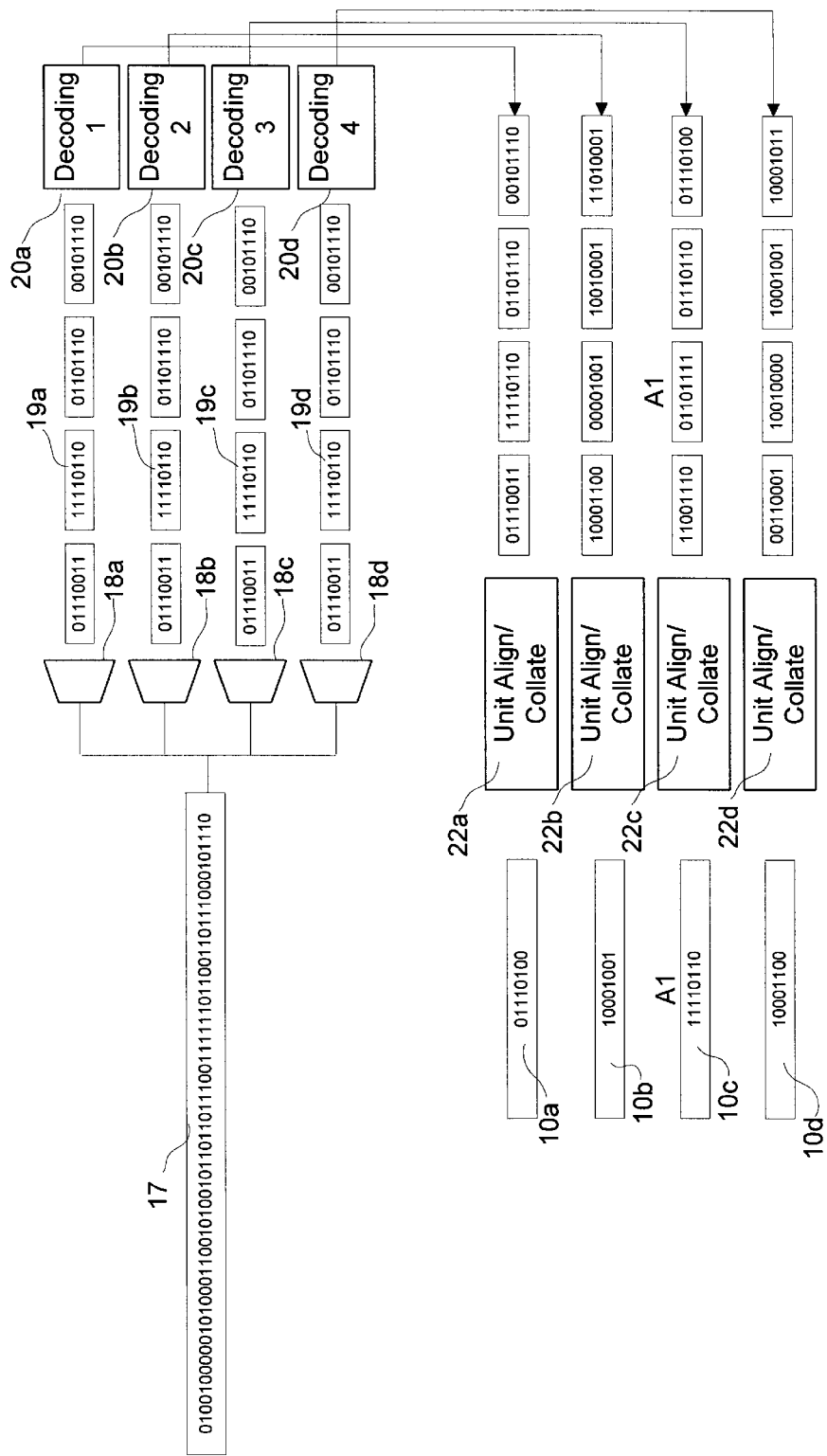
FIG. 3 illustrates an example of the functioning of the decoding and collating aspect of an embodiment of the invention.

FIG. 3 is a schematic diagram that illustrates an example of the decoding and collating aspects of the embodiment of the invention shown in FIGS. 1 and 2. FIG. 3 illustrates the decoding process performed to recover the original data streams 10a–10d. The aggregate data stream 17 is replicated to each of four deserializers 18a–18d. The four deserializers 18a–18d are adapted to divide the aggregate data stream 17 into data words, which are further decoded, if required, into data units. As explained above, retrieving the four data streams involves applying to four replications 19a–19d of the aggregate data stream 17, four respective decoding, frame detection and collating procedures. Each of the four frame detection and decoding procedures are associated with a one of the four data streams 19a–19d, and uses decoders 20a–20d for reverting the encoding of the respective encoders 14a–14c. The respective decoders 20a–20d revert only data units associated with the corresponding input data streams 10a–10d, The decoded A1 and A2 framing bytes of the respective data streams 19a–19d can thus be detected. This permits respective data unit collators 22a–22d to locate the beginning of a frame, and to then select the respective data units that are a part of the frame, as described above.

As will be understood by persons skilled in the art, the A1/A2 framing bytes in the respective data streams 19a–19d are separated by m bytes (m=4, in this example). Consequently, the collators 20a–20d are programmed to detect the A1 byte and then inspect a subsequent $M^{th}$ byte to determine if it is an A2 byte. If the $m^{th}$ byte is an A2 byte, frame lock is declared. The collators 22a–22d then respectively select each $m^{th}$ subsequent byte to reconstruct each of the respective data streams 10a–10d until an end of the frame is reached, at which time the process restarts with a detection of a next A1 byte, indicating the beginning of a new frame. Output of the collators 22a–22d is byte aligned.

Figure 4:
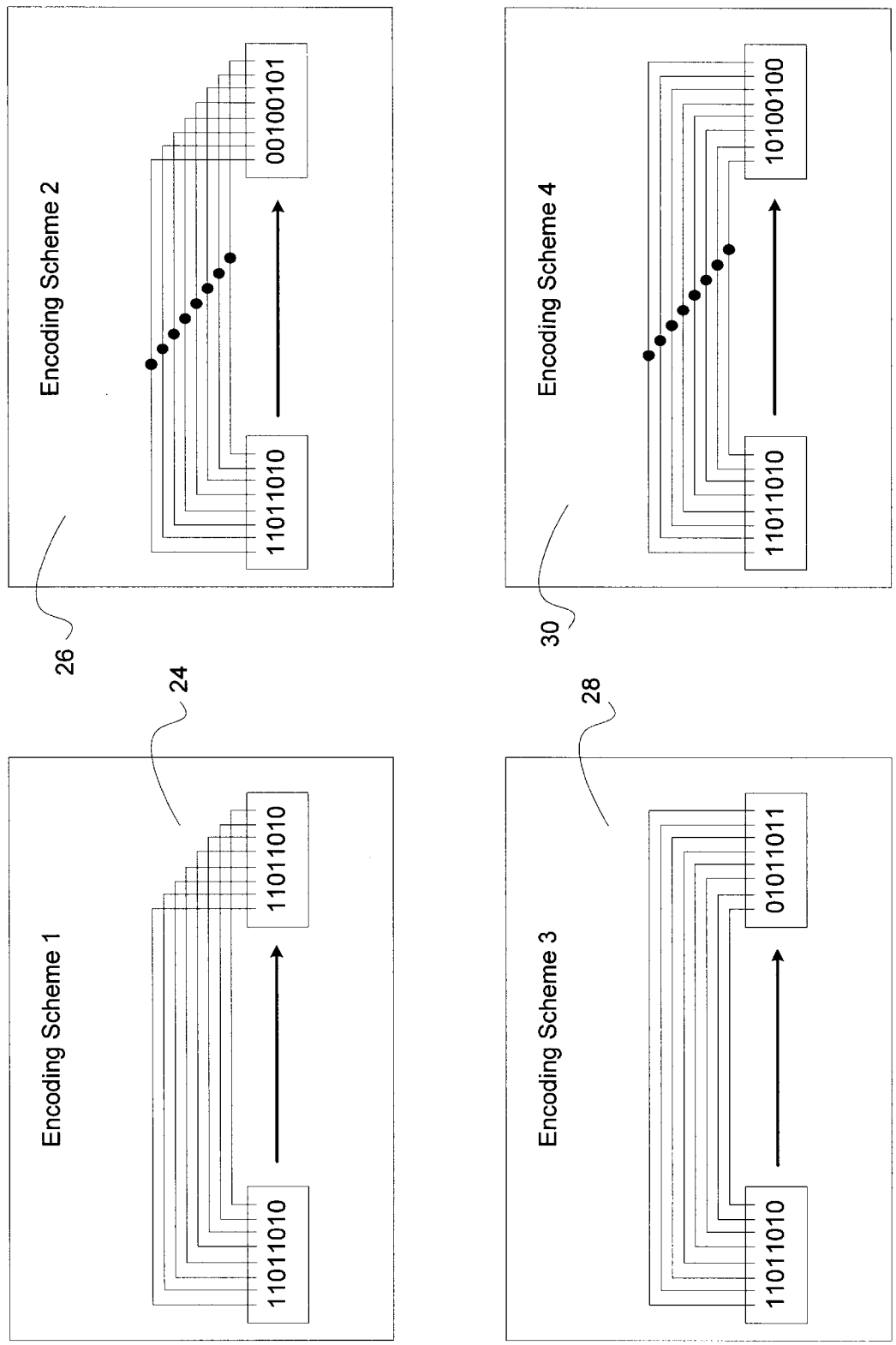
FIG. 4 is a schematic diagram of encoding/decoding schemes that may be used to practice the method in accordance with the invention.

FIG. 4 is a schematic diagram illustrating four exemplary encoding schemes in accordance with an embodiment of the invention. As shown in FIG. 4, a first encoding scheme 24 is a straight passthrough of a data unit. The encoding schemes 26 negates each bit of the data unit without changing an order of the respective bits in data unit. A third encoding scheme 28 reverses an order of the bits in the data unit, to produce a mirror image of the original data unit. With the encoding scheme 30, the order of the bits in the data unit is reversed and each bit is negated. It should be noted that a second application of any one of these encoding schemes to a data unit returns the original data unit. The encoding schemes 24–30 can therefore be described as self-inverting, orthogonal encoding streams.

One application of the invention is to improve bandwidth usage in Wave Division Multiplexed (WDM) optical networks, while providing a service that remains transparent and protocol independent. The invention permits up to m data streams to be interleaved for transport without reformatting the frames or performing pointer processes. Thus, network operation is simplified, transport efficiency is improved and frames are delivered in a condition in which they were received.

The invention has been illustrated using a simple case in which m=4. As will be understood by those skilled in the art, however, m can be less than or greater than four, depending on the bandwidth of the input synchronous data streams and a capacity of the aggregate data path that carries the aggregate data stream 17. It should also be understood that one or more data streams may be added to or dropped from the aggregate data stream without affecting the integrity of the data stream if the procedures described above are followed.

The embodiment of the invention described above is intended to be exemplary only. The scope of the invention is therefore intended to be limited solely by the scope of the appended claims.

I claim:

1. A method of conveying m synchronous data streams as an aggregate data stream from which the m synchronous data streams are recovered; the method comprising steps of;
   a) detecting a beginning of respective frames of each of the m synchronous data streams;
   b) parsing the frames of each of the m synchronous data streams into fixed-length data units;
   c) applying a unique respective encoding scheme to the data units of each of the m synchronous data streams;
   d) interleaving the encoded data units to form the aggregate data stream; and
   e) decoding at least one of the m synchronous data streams by passing the aggregate data stream through a respective decoder to recover the frames of at least one of the m synchronous data streams.

2. A method as claimed in claim 1 wherein the step of detecting a beginning of respective frames comprises a step of detecting at least one framing byte at a fixed location in the respective frame of each of the m respective data streams.

3. A method as claimed in claim 1 wherein each data unit comprises a byte.

4. A method as claimed in claim 3 wherein each of the m synchronous data streams comprises one of a Synchronous Transport Mode (STM)-n data stream and a Synchronous Transport Signal (STS)-3n data stream.

5. A method as claimed in claim 1 wherein the aggregate data stream is converted into an optical signal and transported over an optical fiber.

6. A method as claimed in claim 1 wherein the step of decoding at least one of the synchronous data streams comprises steps of:
   a) producing a copy of the aggregate data stream;
   b) passing the copy through a decoder to reverse the encoding scheme applied to the one of the m synchronous data streams;
   c) detecting at least one framing byte indicating a beginning of a frame in the aggregate data stream;
   d) collating data units of a frame of the one of the m synchronous data streams by selecting the at least one framing byte, and each $m^{th}$ subsequent data unit, until at least one framing byte indicating a next frame is detected.

7. A method as claimed in claim 6 wherein the step of decoding further comprises steps of:
   a) dividing the aggregate data stream into units; and
   b) applying to each of the data units a decoding scheme for reversing the encoding scheme applied to the one of the m synchronous data streams.

8. A method as claimed in claim 7 wherein the encoding scheme is self-inverting.

9. A method as claimed in claim 6 wherein at least one of the m synchronous data streams has a second framing byte located in the frame a fixed number n of data units behind a first framing byte, and the step of detecting at least one data unit that indicates a beginning of a frame comprises steps of:
   a) declaring a detection of the first framing byte when the first framing byte is detected;
   b) examining the data stream to detect a second framing byte nm+(m−1) data units after the detected first framing byte; and
   c) if the second framing byte is detected, declaring frame lock.

10. A method as claimed in claim 9 wherein the distance between the first and the second framing bytes is 0 bytes, and the step of examining involves inspecting the data stream at m data units after detecting the first framing byte to detect the second framing byte.

11. A method of improving bandwidth usage on a channel of a Wave Division Multiplexed (WDM) optical fiber in one of a Synchronous Optical NETwork (SONET) and a Synchronous Digital Hierarchy (SDH) network, comprising steps of:
   a) dividing each of m respective data streams into consecutive data units;
   b) applying a respective unique encoding scheme to each of the data units in the m synchronous data streams; and
   c) multiplexing the encoded data units into an aggregate data stream that is transmitted over the channel.

12. A method as claimed in claim 11 further comprising a step of recovering one of the m synchronous data streams from the aggregate synchronous data stream.

13. A method as claimed in claim 12 wherein the step of recovering comprises steps of;
   a) producing a copy of the aggregate data stream and dividing the copied data stream into data units;
   b) passing the data units through a decoder to reverse the encoding scheme applied to the one of the m synchronous data streams;
   c) detecting at least one framing byte indicating a beginning of a frame of the one of the m synchronous data streams in the aggregate data stream; and
   d) collating data units of the respective one of the m synchronous data streams by selecting the at least one framing byte, and each $m^{th}$ subsequent data unit from the copy of the aggregate data stream.

14. A method as claimed in claim 11 wherein the use of the channel is optimized by multiplexing a maximum number of synchronous data streams that the channel can support.

15. A method of protocol transparent multiplexing of m synchronous data streams, using m independent encoding schemes, comprising steps of;
   a) parsing each of the m synchronous data streams into data units;
   b) applying a respective, independent encoding scheme to the data units of respective ones of the m synchronous data streams; and
   c) byte interleaving the m synchronous data streams to form an aggregate data stream without pointer processing the frames of the m synchronous data streams.

16. A method as claimed in claim 15 further comprising steps of:
   d) producing m copies of the aggregate data stream;
   e) parsing the respective aggregate data streams into data units;
   f) passing each of the data units of the m copies through a respective decoder to reverse a one of the m independent encoding schemes;
   g) inspecting the respective data units to detect a framing byte that indicates a beginning of a frame of the data stream encoded by the respective one of the m independent encoding schemes; and
   h) thereafter selecting each $m^{th}$ data unit from the aggregate data stream to recover the respective one of the m data streams.

17. The method as claimed in claim 16 wherein the encoding scheme is self-inverting and the decoder applies a respective encoding scheme to the aggregate data stream.

18. An apparatus for multiplexing m synchronous data streams using m unique encoders, comprising:
   a) means for detecting at least one framing byte in each of the m synchronous data streams and parsing frames of the m synchronous data streams into data units of a predetermined length;
   b) m unique encoders each adapted to independently encode data units of a respective one of the m synchronous data streams; and
   c) means for serializing the m synchronous data streams into an aggregate data stream by interleaving the encoded data units of the respective m synchronous data streams.

19. An apparatus as claimed in claim 18 wherein the means for detecting comprises:
   a) a circuit for inspecting an incoming one of the m synchronous data streams to detect at least one framing byte that indicates a beginning of a frame of the incoming data stream; and
   b) a circuit for parsing the incoming data stream into data units after the at least one framing byte has been detected.

20. An apparatus as claimed in claim 18 wherein each of the m unique encoders comprises a self-inverting map of n bit values where n is the number of bits in a data unit.

21. An apparatus as claimed in claim 20 wherein at least one of the m unique encoders comprises a circuit for performing at least one of negating a specified bit value and switching a bit order of at least two specified bits.

22. An apparatus as claimed in claim 20 wherein one of the encoders comprises a circuit for passing through the data units without modification.

23. An apparatus as claimed in claim 20 wherein one of the encoders comprises a circuit for reversing an order of bits in the data units.

24. An apparatus as claimed in claim 20 wherein one of the encoders comprises a circuit for negating a value of bits in the data units.

25. An apparatus as claimed in claim 20 wherein one of the encoders comprises a circuit for reversing an order and negating a value of bits in the data units.

26. An apparatus for de-serializing and decoding m encoded synchronous data streams multiplexed into an aggregate data stream, comprising:
   a) means for producing at least one copy of the aggregate data stream;
   b) means for applying to the at least one copy of the aggregate data stream a decoding scheme to reverse the encoding of data units of a respective one of the m encoded synchronous data streams;
   c) means for detecting at least one framing byte within the aggregate data stream; and
   d) means for extracting each $m^{th}$ subsequent data unit from the aggregate data stream.

27. An apparatus as claimed in claim 26 wherein the means for applying comprises:
   a) a parser for parsing the copy of the aggregate data stream into successive data units;
   b) a decoder adapted to receive the successive data units and apply the decoding scheme to the respective ones of the data units.

28. An apparatus as claimed in claim 27 wherein the decoder is identical to an encoder used to encode the data units.

29. An apparatus as claimed in claim 26 wherein the means for detecting comprises a detector adapted to detect framing bytes conforming to either one of SONET and SDH protocols.

30. A system for transparently transporting m synchronous data streams as an interleaved aggregated data stream on a single channel of a Wave Division Multiplexed (WDM) optical link without pointer processing, comprising in combination:

a) a multiplexer adapted to receive the m synchronous data streams, parse the respective data streams into data units, encode the respective data units using m unique encoding schemes and interleave the encoded data streams into the aggregate data stream; and b) a demultiplexer for receiving the aggregate data stream, reproducing the aggregate data stream to form m aggregate data streams, parsing each of the m aggregate data streams into the data units, applying a decoding scheme to the respective aggregate data streams and selecting data units from the respective decoded data streams to recover frames of the respective m synchronous data streams.

31. The system as claimed in claim 30 wherein the m synchronous data streams are any one of SONET and SDH data streams.

32. The system as claimed in claim 30 wherein the multiplexer and the demultiplexer are cards in one of respective cross-connects and switches.

33. The system as claimed in claim 30 wherein the m unique coding schemes are all self-inverting.

* * * * *